United States Patent [19]

Beck

[11] Patent Number: 4,752,935
[45] Date of Patent: Jun. 21, 1988

[54] RECESSED HELICAL ELECTRODE STRUCTURE IN A GAS LASER

[75] Inventor: Rasmus Beck, Neu Isenburg, Fed. Rep. of Germany

[73] Assignee: Lasertechnik GmbH, Heusenstamm, Fed. Rep. of Germany

[21] Appl. No.: 837,354

[22] Filed: Mar. 7, 1986

[30] Foreign Application Priority Data

Mar. 20, 1985 [DE] Fed. Rep. of Germany ....... 3510002
Oct. 15, 1985 [DE] Fed. Rep. of Germany ....... 3536693

[51] Int. Cl.$^4$ .......................... H01S 3/097; H01S 3/22
[52] U.S. Cl. .......................................... 372/55; 372/58; 372/59; 372/60; 372/61; 372/82; 372/83; 372/87; 372/88
[58] Field of Search .................... 372/82, 83, 87, 88, 372/61, 60, 59, 58, 55

[56] References Cited

U.S. PATENT DOCUMENTS

| 864,961 | 9/1907 | Fallek et al. | 340/52 R |
|---|---|---|---|
| 3,427,567 | 2/1969 | Bridges et al. | 372/82 |
| 3,725,735 | 4/1973 | Beaulieu et al. | 372/83 |
| 3,772,610 | 11/1973 | Foster et al. | 372/58 |
| 3,803,512 | 4/1974 | Pettipiece | 372/87 |
| 3,864,646 | 2/1975 | Phillips et al. | 372/59 |
| 4,155,052 | 5/1979 | Osche et al. | 372/87 |
| 4,207,540 | 6/1980 | Ernst | 372/38 |
| 4,242,646 | 12/1980 | Macken | 372/87 |
| 4,260,958 | 4/1981 | Wayne et al. | 372/87 |
| 4,329,662 | 5/1982 | Yagi et al. | 372/38 |
| 4,342,114 | 7/1982 | Luck | 372/87 |
| 4,345,331 | 8/1982 | Hoag | 372/87 |
| 4,370,598 | 1/1983 | Krahn | 372/87 |
| 4,504,954 | 3/1985 | Güers et al. | 372/61 |
| 4,601,039 | 7/1986 | Sze | 372/87 |
| 4,611,329 | 9/1986 | Ernst et al. | 372/87 |
| 4,618,961 | 10/1986 | Sutter, Jr. | 372/87 |
| 4,631,732 | 12/1986 | Christensen | 372/87 |

FOREIGN PATENT DOCUMENTS

| 3170 | 1/1985 | Japan | 372/87 |
|---|---|---|---|
| 1128947 | 10/1968 | United Kingdom | |

OTHER PUBLICATIONS

Nam et al. "Operational Characteristics of a PIE $CO_2$ Laser" IEEE Journal of Quantum Electronics, vol. QE-15, No. 1, Jan. 1979.
Hiroyuki Sigaware et al., Rev. Laser Eng. (Jap) 9 (1) 21–30 (1981).
Haruhiko Nagai et al., IEEE J. Quant. Electron vol. QE-18 (3) 416–421 (1982).
Bondarenko et al., Sov. J. Quant. Electron. 10 (4), 443–445 (1980).
Gavrilyuk et al., Sov. J. Quant. Electron. 326–328 (1979).

*Primary Examiner*—Gene Wan
*Assistant Examiner*—Michael B. Shingleton
*Attorney, Agent, or Firm*—Fisher, Christen & Sabol

[57] ABSTRACT

For the excitation of a discharge in a laser gas, an electrode arrangement is provided which consists of at least two elongated electrodes wound approximately in a cylindrical helical line. The double helix thus formed is arranged on or concentrically within a gas flow tube.

4 Claims, 2 Drawing Sheets

RECESSED HELICAL ELECTRODE STRUCTURE IN A GAS LASER

BACKGROUND OF THE INVENTION

1. Field Of The Invention

The invention relates to a device for the excitation of a discharge in a laser gas having at least two metal electrodes.

2. Prior Art

For the excitation of gas lasers, especially in $CO_2$ high-power lasers, direct-current discharge is used in general. A distinction is made between longitudinal and transverse excitation. In the case of longitudinal excitation, two electrodes are arranged at the ends of a discharge tube, between which a discharge is ignited [Hiroyuki Sigawara et al., Rev. Laser Eng. (Jap.) 9 (1) 21–30, (1981)]. A drawback is the often quite high operating voltage of typically 10 to 20 kV. In the case of transversely excited lasers only significantly lower voltages of about 1 to 2 kV are necessary. In the latter case, however, it is difficult to extend the discharge onto the flat electrodes arranged parallel to the discharge region. This can preferably be reached by segmented electrodes, for example plates or pins, which are connected with the operating voltage via separate series resistors [U.S. Pat. Nos. 3,772,610; 864,961; Haruhiko Nagai et al., IEEE J. Quant. Electron. Vol. QE-18(3), 416–421, (1982)].

Homogeneous transverse excitation of a laser gas volume can be obtained in a particularly simple manner by using resistive electrodes consisting for example, of thoriated tungsten (U.S. Pat. No. 4,260,958). All of these excitation systems, however, have the same disadvantage that ohmic losses reducing the efficiency of the laser occur in the resistors which are necessary to stabilize the gas discharge.

Laser excitation systems which operate with alternating voltage do not have this drawback, since in this case it is possible to use capacitive or inductive stabilization impedances [Bondarenko et al., Sov. J. Quant. Electron. 10 (4), 443–445, (1980); Gavrilyuk et al., Sov. J. Quant. Electron. 326–328 (1979)].

It is known that in the case of high-power lasers, especially $CO_2$ lasers, the laser gas has to be circulated very rapidly and passed through external heat exchangers in order to eliminate power dissipation. Therefore, the excitation systems must be designed such that they impede the gas flow to the minimum possible extent. In this respect such transversely excited systems are particularly favorable in which gas flow, gas discharge and optical resonator are orthogonally arranged with respect to each other. These systems have the major drawback, however, that the excited volume does not correspond to the resonator volume. In order to utilize the total excitation volume, complicated zig-zag resonator arrangements have to be used, in which an emission in the transverse lowest order mode which is necessary for many technical applications of lasers is difficult to reach. Longitudinal systems, on the other hand, in which the excitation system and the resonator are arranged on one axis along which also the laser gas flows, permit an optimum beam quality to be reached in a relatively simple manner. But, such systems have the disadvantage of high operating voltage and higher gas circulation losses.

BROAD DESCRIPTION OF THE INVENTION

The object of the invention is to provide an electrode arrangement for high-power lasers, which impedes the gas flow to the minimum possible extent and by means of which the total laser gas volume can be excited without the necessity of high operating voltages.

According to the invention, the electrodes are wound approximately in a cylindrical helical line, such electrodes together forming at least one double helix, the turns of one electrode being spaced from the turns of the other electrode, and such electrodes extending lengthways with respect to the discharge tube.

Preferably the inside diameters of the helical electrodes are essentially equal and wherein the turns of all electrodes are parallel to each other. Four helical electrodes are preferably provided, one double helix serving as the main electrodes and the other double helix serving for preionization. The helical main electrodes preferably are formed as tubes and connected to a cooling medium circuit.

Preferably the helical electrodes consist of wires or rods, most preferably of circular or oval cross-section. The inside diameter of the double helix is preferably smaller than the lateral spacing of the turns of the electrodes forming the double helix. Preferably the helical electrodes have a surface insulation and are arranged concentrically within a discharge tube. The helical electrodes have an uneven surface and are most preferably provided with vortex-generating edges. The helical electrodes are preferably provided with a dielectric coating. Preferably the dielectric coating is formed by anodic oxidation of the electrode material and/or consists of ceramics or enamel.

Preferably the inside diameter of the discharge tube is larger than the outside diameter of the double helix. The distance between the double helix and the discharge tube preferably corresponds to about half the inside diameter of the double helix.

Preferably the helical electrodes are wound on a discharge tube. The discharge tube is preferably provided with helical recesses which run corresponding to the helical shape of the electrodes and which serve as guides for the electrodes. The helical recesses in the discharge tube preferably extend into the interior space of the discharge tube so that the discharge cross-section is smaller than the cross-section of the discharge tube available for the flow of the laser gas.

Preferably the discharge tube consists of glass or of another dielectric material. Also, preferably the discharge tube consists of a thermally conductive ceramic material. The discharge tube also preferably is arranged essentially concentrically inside a casing. In the space between the casing and the discharge tube a cooling medium is preferably circulated.

DETAILED DESCRIPTION OF THE INVENTION

The electrodes can, for example, consist of metal wires, rods, strips, tubes or the like. Tubes permit connection to a cooling medium circuit. The form of the cross-section of the electrodes is not an important factor, but circular or oval wires or tubes are preferably used. Suitable electrode materials are all metals known for this purpose, for example copper, aluminum, titanium or tantalum.

The helical shape of the electrodes can be achieved in a known manner, for example, by helical winding of the wires on a cylindrical core. The diameter of the helix can vary insignificantly along the length, for example, it can be a little larger at the ends, in order to adapt the discharge volume to the resonator volume. Thereby, a suitable spacing of the turns has to be provided which, in order to ensure excitation of a discharge extending axially through the whole volume of the laser gas, must be larger than the inside diameter of the helix. Preferably, the spacing of the turns corresponds to more than twice the inside diameter of the helix. This is to ensure that, in case of two evenly spaced, helically wound main electrodes of the same diameter, the lateral distance between the two electrodes is larger than the inside diameter of the double helix. According to a preferred embodiment, two double helixes are used, one representing the main electrodes and the other one being used for preionization. The helixes are arranged such that contact between them is avoided.

According to another embodiment, the helical electrodes are insulated on their surface and arranged concentrically in a discharge or gas flow tube. Insulation of the electrodes can be carried out in a known manner by anodic oxidation. Alternatively, the electrodes can be provided with a ceramic or enamel coating. Another alternative is to provide the wires or rods with a flexible insulating coating, preferably prior to winding them.

If the electrodes are arranged within the discharge tube, it is favorable to make the surface of the electrodes such that moderate vortex generation within the laser gas flow is effected, in order to achieve effective mixing of the laser gas. For this purpose, several possibilities exist, for example, vortex-generating edges can be provided.

The electrode connections which protrude from the casing and/or the gas flow tube permit satisfactory fastening of the helix. Additional anchorage elements consisting of insulated material can also be used. The helical electrodes can also be arranged without any spacing to the inner wall of the gas flow tube which is, in this case, made from a non-conducting material, so that the electrodes are in close contact with the wall the gas flow tube. Therefore, the laser gas flows exclusively inside the helix.

According to a further preferred embodiment of the invention, the electrodes are wound helically on a discharge tube. It is favorable to provide the discharge tube with recesses whose shape corresponds to the helical shape of the electrodes.

The electrodes are guided in these grooves, i.e., in these recesses.

According to a particularly favorable embodiment, the recesses continue on the inner wall of the discharge or gas flow tube so that the inner wall of the discharge tube is provided with helical elevations, whose shape corresponds to the shape of the electrodes. Consequently, the cross-section D of the discharge space is smaller than the cross-section $D_o$ of the discharge tube which is available for laser gas flow. A ratio $D_o:D=3:1$ permits a ratio of up to 6:1 of cross-sections for flow and discharge to be realized, which significantly facilitates cooling of the laser gas.

Such an arrangement of electrodes and discharge tube may be surrounded by a casing whose shape preferably corresponds to that of the discharge tube, in such a manner that a space is left between the casing and the discharge tube. In this space a cooling medium, for example silicone oil, can circulate. Cooling of the laser tube walls is favorable in particular because electrode power dissipation can thus directly be eliminated and therefore does not contribute to heating of the laser gas.

The discharge and/or gas flow tube supporting the helical electrodes consists preferably of a thermally-conductive ceramic material, for example beryllium oxide. The electrodes can then fully be embedded in the ceramic material, cooling being provided by an outer cooling jacket. In this case, water can be used as cooling medium.

The arrangement of the excitation system according to the invention renders possible the combination of the advantages of transversely excited systems and longitudinal systems. The total gas volume can thus be excited without the gas flow being substantially impeded.

BRIEF DESCRIPTION OF THE DRAWING

The invention is described in more detail on the basis of the schematic drawings. In the drawings.

DETAILED DESCRIPTION OF THE DRAWINGS

Figure 1:
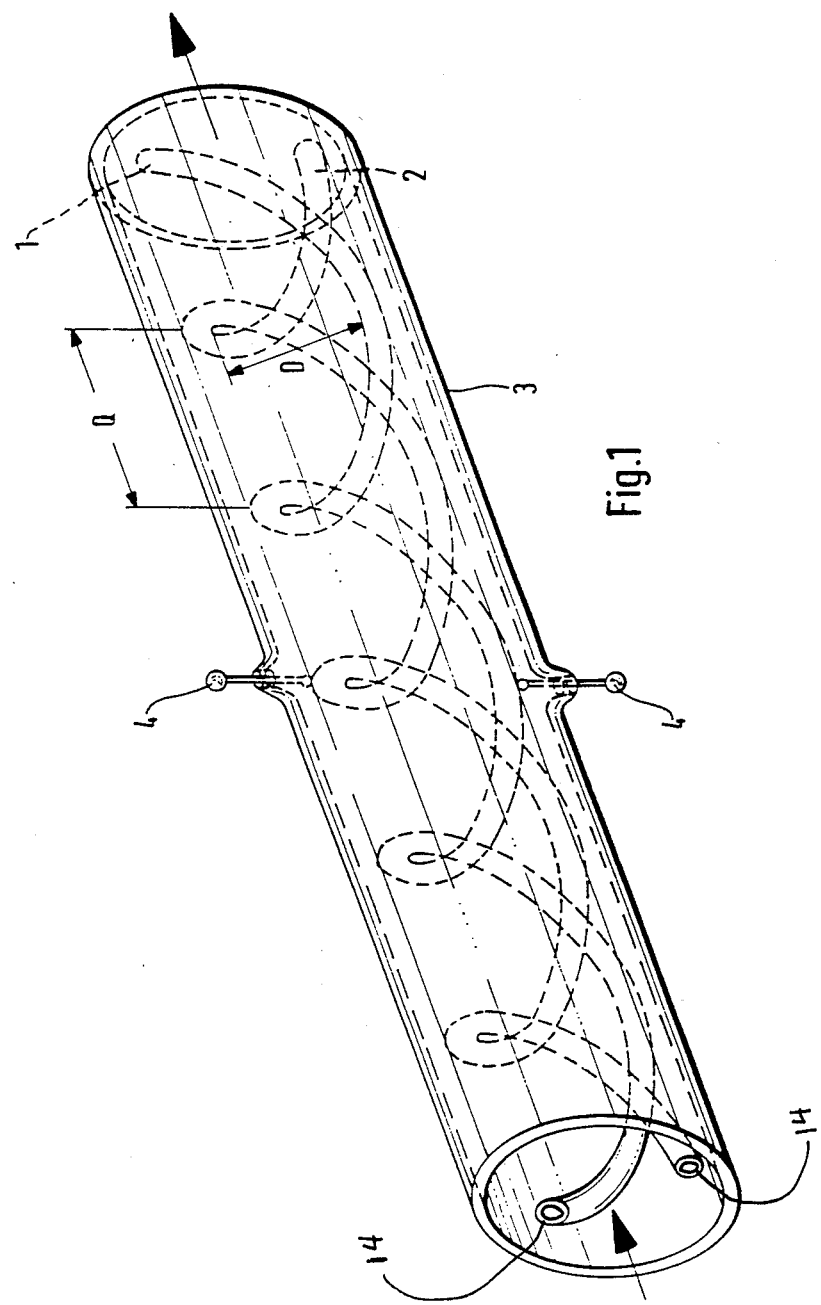
FIG. 1 is a perspective view of an embodiment of the invention in which the helical electrodes are arranged within a gas flow tube.

According to FIG. 1, the excitation system consists of two electrodes 1 and 2, which are surrounded by a gas flow tube. Electrodes 1 and 2 are helically wound such that a double helix is formed. The spacing of the turns of the helix with respect to each other must be chosen such that lateral distance Q of electrodes 1 and 2 is a little larger than inside diameter D. The electrodes consist of, for example, anodically oxidized metal such as aluminum or tantalum, or of a metal provided with a surface glazing.

In order to excite the gas discharge, a high-frequency alternating voltage of, for example, f=10 kHz is applied to electrode connections 4, which extend through gas flow tube 3. The dielectric coating results in formation of a surface capacitor on the electrodes which, according to its impedance, distributes the discharge substantially largely loss-free over the total length of electrodes 1 and 2. The upper limit of the operating frequency is preferably about 13.7 MHz. This represents a frequency band kept free for technical purposes and at which semi-conductor elements can be used without substantial technical effort. But it is also possible to raise the excitation frequency up to the 100-MHz-range.

Depending on the gas pressure of the laser, the operating voltage ranges between 500 and 2000 $V_{ss}$. The specific arrangement of the electrodes results in a helically wound discharge geometry, which, at a right angle to the resonator axis shows an amplification profile with optimum adaptation to the requirements for generation of the radiation in the fundamental mode.

A longitudinal gas flow is passed through flow tube 3 surrounding the discharge arrangement. This permits, the flow resistance of the system to be substantially reduced compared with other laser tubes with longitudinal gas flow, since the inside diameter of tube 3 may be substantially larger than outside diameter of the double helix. The gas can, therefore, also flow outside the electrodes through tube 3 but, as a result of the vortex formation along electrodes 1 and 2, it is permanently mixed with the gas flowing inside the electrodes and, thus, participates in the excitation process. If necessary the vortex formation may be intensified by suitable design of the electrodes. The cross-section of gas flow is, therefore, essentially larger than the cross-section of the resonator; in spite of this, almost all the gas molecules flowing through tube 3 participate at least once in the excitation and emission process. Due to the increased mass flow rate, efficient cooling is possible. If necessary, tubes may be used as electrodes 1 and 2, which can be directly cooled.

Figure 2:
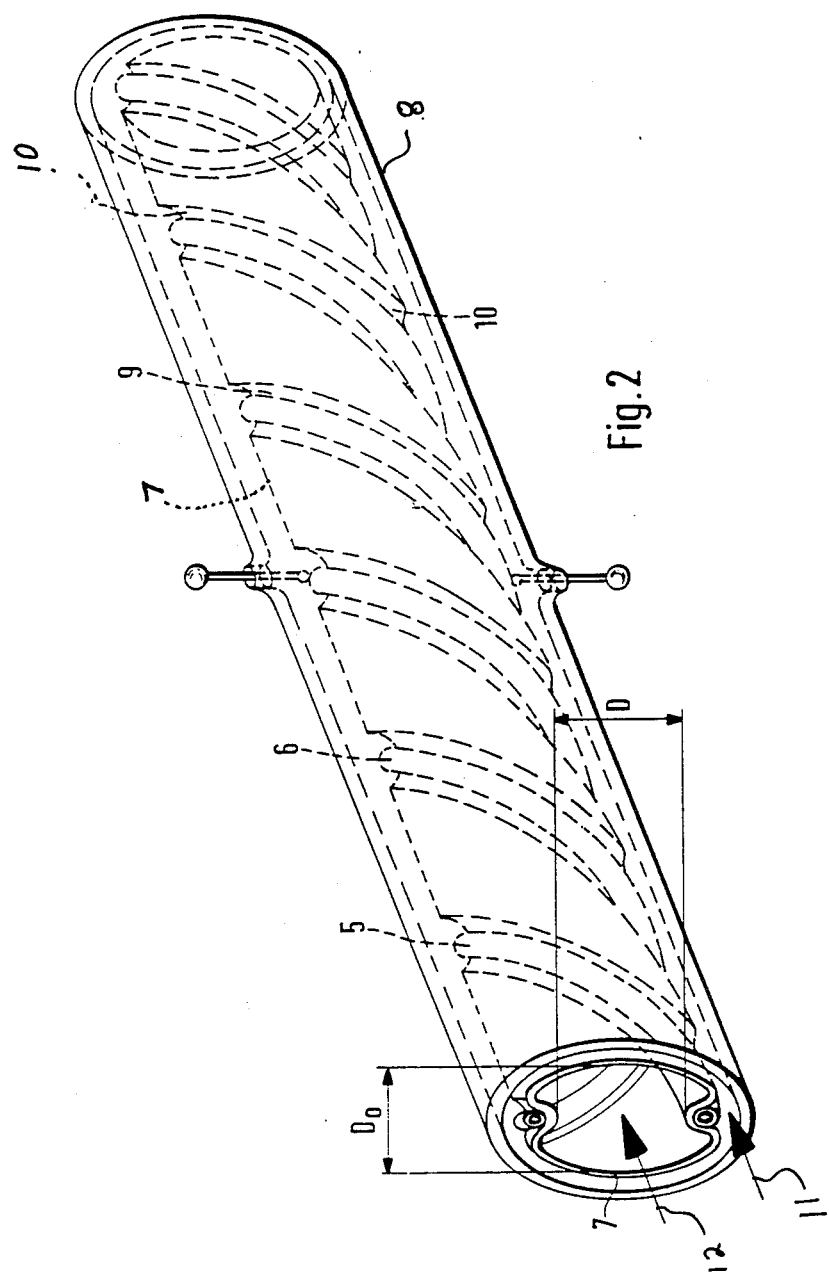
FIG. 2 is a perspective view of another embodiment of the invention in which the helical electrodes are guided in recesses on the surface of the gas flow tube.

According to a most preferred embodiment, which is shown in FIG. 2, electrodes 5 and 6 are arranged on the outer surface of gas flow and discharge tube 7 in helical form. Thus, they are placed within the space between outer casing 8 and discharge tube 7, discharge tube 7 serving at the same time as a support for electrodes 5 and 6.

Discharge tube 7 is shaped such that two helical recesses 9 and 10 are formed in which electrodes 5 and 6 are inserted. In the arrangement shown in FIG. 2, recesses 9 and 10 deform the inside wall of tube 7 such that the inner wall of the discharge tube receives helical elevations.

Free diameter D of discharge tube 7 defines the cross-section of gas discharge. Compared with it, cross-section $D_o$ of the gas flow region is substantially larger. It results from diameter $D_o$ of non-deformed discharge tube 7 minus the cross-sections required by recesses 9 and 10 or elevations. The cooling medium, for example silicone oil, is introduced, in the direction of the arrow, into the space between discharge tube 7 and the casing 8.

What is claimed is:

1. Device for the excitation of a discharge in a laser gas flowing in a flow tube, the device having at least two continuous helical electrodes, being provided in helical recesses on the flow tube, the walls of the helical recesses extending into the interior space of the flow tube such that the discharge cross-section between the two electrodes is smaller than the cross-section of the discharge tube available for the flow of the laser gas.

2. Device as claimed in claim 1 wherein the flow tube is arranged essentially concentrically in a casing.

3. Device as claimed in claim 2 wherein the space between the casing and the flow tube a cooling medium is circulated.

4. Device for the excitation of a discharge in a laser gas flowing in a flow tube, comprising at least two continuous helical electrodes which are provided with a surface insulation and arranged as at least one double helix inside the flow tube spaced with regard to the inner wall of the flow tube so as to provide in the cylindrical space surrounded by the helical electrodes a discharge space for the laser gas and in a tube-like space between the helical electrodes and the inner wall of the flow tube an additional flow path for the non-excited laser gas.

* * * * *